United States Patent
Kuang et al.

(10) Patent No.: US 7,787,628 B2
(45) Date of Patent: Aug. 31, 2010

(54) DOUBLE PHASE ENCODING QUANTUM KEY DISTRIBUTION

(75) Inventors: Randy Kuang, Kanata (CA); Guo Qiang Wang, Kanata (CA); John Stankus, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1089 days.

(21) Appl. No.: 11/481,826

(22) Filed: Jul. 7, 2006

(65) Prior Publication Data

US 2007/0076888 A1   Apr. 5, 2007

Related U.S. Application Data

(63) Continuation of application No. PCT/CA2006/000644, filed on Apr. 24, 2006.

(60) Provisional application No. 60/872,425, filed on Sep. 30, 2005.

(51) Int. Cl.
*H04L 9/00* (2006.01)

(52) U.S. Cl. .................. 380/278; 380/256; 380/283; 713/150; 713/189

(58) Field of Classification Search ............ 713/1, 713/2, 150, 188, 189, 194, 501, 502; 380/200, 380/201, 255, 256, 277, 278, 283; 726/2
See application file for complete search history.

(56) References Cited

U.S. PATENT DOCUMENTS

| | | | |
|---|---|---|---|
| 5,675,648 A | 10/1997 | Townsend | |
| 5,732,139 A | 3/1998 | Lo et al. | |
| 5,764,765 A | 6/1998 | Phoenix et al. | |
| 5,768,378 A | 6/1998 | Townsend et al. | |
| 5,953,421 A | 9/1999 | Townsend | |

(Continued)

FOREIGN PATENT DOCUMENTS

| | | |
|---|---|---|
| WO | PCT/CA2006/000644 | 8/2006 |
| WO | PCT/CA2006/000645 | 8/2006 |
| WO | PCT/CA2006/000646 | 8/2006 |
| WO | PCT/CA2006/000647 | 8/2006 |

OTHER PUBLICATIONS

Arda, A Quantum Information Science and Technology Roadmap, Jul. 19, 2004, 17 pages, Version 1.0, United States of Amercia, http://qist.lanl.gov.

(Continued)

*Primary Examiner*—Kimyen Vu
*Assistant Examiner*—Joseph Pan

(57) ABSTRACT

A method of distributing a quantum key from a sender to a recipient. The recipient generates a pulse having multiple photons; splits the pulse into first and second sub-pulses; phase modulates the first sub-pulse with a secret key; and transmits both the phase-modulated first sub-pulse and the second sub-pulse to the sender. The sender receives the phase-modulated first sub-pulse and the second sub-pulse from the recipient; encodes a quantum key bit into one of the sub-pulses received from the recipient; and transmits both the phase-modulated first sub-pulse and the second sub-pulse back to the recipient. Then, the recipient receives the phase-modulated first sub-pulse and the second sub-pulse from the sender; phase modulates the second sub-pulse with the secret key; combines the phase-modulated first sub-pulse and the phase-modulated second sub-pulse to produce a composite pulse; and processes the composite pulse in an attempt to detect the quantum key bit.

27 Claims, 2 Drawing Sheets

U.S. PATENT DOCUMENTS

| | | | |
|---|---|---|---|
| 6,188,768 B1 * | 2/2001 | Bethune et al. | 380/278 |
| 6,438,234 B1 | 8/2002 | Gisin et al. | |
| 6,678,379 B1 | 1/2004 | Mayers et al. | |
| 6,801,626 B1 * | 10/2004 | Nambu | 380/256 |
| 7,233,672 B2 * | 6/2007 | Mitchell et al. | 380/278 |
| 7,570,767 B2 * | 8/2009 | Lo | 380/263 |
| 2002/0097874 A1 | 7/2002 | Foden et al. | |
| 2004/0161109 A1 | 8/2004 | Trifonov | |
| 2004/0190725 A1 | 9/2004 | Yuan et al. | |
| 2005/0135627 A1 | 6/2005 | Zavriyev et al. | |
| 2005/0190922 A1 | 9/2005 | LaGasse | |
| 2005/0286723 A1 | 12/2005 | Vig et al. | |
| 2006/0222180 A1 * | 10/2006 | Elliott | 380/263 |
| 2006/0239463 A1 | 10/2006 | Young | |

OTHER PUBLICATIONS

Id Quantique SA, Understanding Quantum Cryptography, Apr. 2005, 12 pages, Version 1.0, Switzerland.

James Ford, Quantum Cryptography Tutorial, May 16, 2005, 5 pages, http://www.cs.dartmouth.edu/~jford/crypto.html.

BB84 Demo, May 16, 2005, 3 pages, http://monet.mercersburg.edu/henle/bb84/demo.php.

Karen Kelly, Quantum decoys foil code-breaking attempts, Jul. 18, 2005, 3 pages, Univeristy of Toronto, Canada, http://www.news.utoronto.ca/bin6/050718-1521.asp.

Chris Muktar, Modern Quantum Cryptography, 11 pages, Department of Theoretical Physics, University of Manchester, United Kingdom.

Office Action mailed on Aug. 27, 2009 in connection with U.S. Appl. No. 11/481,906.

Office Action mailed on Sep. 16, 2009 in connection with U.S. Appl. No. 11/235,134.

* cited by examiner

US 7,787,628 B2

DOUBLE PHASE ENCODING QUANTUM KEY DISTRIBUTION

CROSS-REFERENCE TO RELATED APPLICATIONS

The present application is a CONTINUATION under 35 USC §120 of PCT International Patent Application bearing Serial No. PCT/CA2006/000644, filed on Apr. 24, 2006, and is hereby incorporated by reference; the present application also claims the benefit of priority under 35 USC §119(e) of U.S. Provisional Patent Application Ser. No. 60/872,425, filed on Sep. 30, 2005, and is incorporated herein by reference.

The present application claims the benefit under 35 USC §120, and is a CONTINUATION-IN-PART, of U.S. patent application Ser. No. 11/241,164 to Kuang et al., filed on Sep. 30, 2005, hereby incorporated by reference herein.

FIELD OF THE INVENTION

This invention relates generally to the field of network communications, and more particularly to communications over a quantum channel.

BACKGROUND

Public key encryption is currently a popular technique for secure network communications. Public key encryption utilizes "one-way functions" that are relatively simple for computers to calculate, but difficult to reverse calculate. In particular, a one way function $f(x)$ is relatively easy for a computer to calculate given the variable x, but calculating x given $f(x)$ is difficult for the computer, although not necessarily impossible. Some one way functions can be much more easily reverse calculated with the assistance of particular "trap door" information, i.e., a key. Public key cryptography utilizes such one-way functions in a two-key system in which one key is used for encryption and the other key is used for decryption. In particular, the one-way function is a "public key" which is openly advertised by Node A for the purposes of sending encrypted messages to Node A. The trap door key is a "private key" which is held in confidence by Node A for decrypting the messages sent to Node A. For two-way encrypted communications each node utilizes a different public key and a different private key. One advantage of this system is that secure key distribution is not required. However, advances in the capabilities of computers tend to erode the level of security provided by public key encryption because the difficulty of reverse calculating the one-way function decreases as computing capabilities increase.

It is generally accepted in the field of cryptology that the most secure encryption technique is the Vernam cipher, i.e., one-time pad. A Vernam cipher employs a key to encrypt a message that the intended recipient decrypts with an identical key. The encrypted message is secure provided that the key is random, at least equal to the message in length, used for only a single message, and known only to the sender and intended receiver. However, in modern communication networks the distribution of Vernam cipher keys is often impractical, e.g., because the keys can be quite long and key distribution itself is subject to eavesdropping.

One technique for secure key distribution is known as Quantum Key Distribution ("QKD"). Quantum Key Distribution transmits an individual photon for each bit of the key being distributed to an intended recipient. The photons may be polarization modulated in order to differentiate logic 1 from logic 0. Distribution of the quantum key is secure because of the laws of quantum physics. In particular, it is not possible to measure an unknown quantum state of a photon without modifying it. Hence, an eavesdropper attempting to intercept the key would introduce detectable errors into the key. Unfortunately, photon-per-bit key distribution is so inefficient with current technology as to be impractical. This is due in-part to the attenuation technique and equipment used to generate a single photon pulse. In particular, in order to avoid transmitting more than one photon the attenuator must be set such that about 91% of the attempted pulses generate zero photons.

SUMMARY OF THE INVENTION

In accordance with a first broad aspect, the present invention seeks to provide a method of distributing a quantum key between a first node and a second node. The method comprises, by the second node: generating a pulse having multiple photons; splitting the pulse into first and second sub-pulses; phase modulating the first sub-pulse with a secret key; and transmitting both the phase-modulated first sub-pulse and the second sub-pulse to the first node. The method further comprises, by the first node: receiving the phase-modulated first sub-pulse and the second sub-pulse from the second node; encoding a quantum key bit into one of the sub-pulses received from the second node; and transmitting both the phase-modulated first sub-pulse and the second sub-pulse back to the second node. Then, the method further comprises, by the second node: receiving the phase-modulated first sub-pulse and the second sub-pulse from the first node; phase modulating the second sub-pulse with the secret key; processing the phase-modulated first sub-pulse and the phase-modulated second sub-pulse in an attempt to detect the quantum key bit.

In accordance with a second broad aspect, the present invention seeks to provide a method of participating in distribution of a quantum key with a first node. The method comprises generating a pulse having multiple photons; splitting the pulse into first and second sub-pulses; phase modulating the first sub-pulse with a secret key; transmitting both the phase-modulated first sub-pulse and the second sub-pulse to the first node; receiving the phase-modulated first sub-pulse and the second sub-pulse from the first node, one of the phase-modulated first sub-pulse and the second sub-pulse having been encoded with a quantum key bit; phase modulating the second sub-pulse with the secret key; processing the phase-modulated first sub-pulse and the phase-modulated second sub-pulse in an attempt to detect the quantum key bit.

In accordance with a third broad aspect, the present invention seeks to provide an apparatus, which comprises means for generating a pulse having multiple photons; means for splitting the pulse into first and second sub-pulses; means for phase modulating the first sub-pulse with a secret key; means for transmitting both the phase-modulated first sub-pulse and the second sub-pulse to a node; means for receiving the phase-modulated first sub-pulse and the second sub-pulse from the node, one of the phase-modulated first sub-pulse and the second sub-pulse having been encoded with a quantum key bit; means for phase modulating the second sub-pulse with the secret key; means for processing the phase-modulated first sub-pulse and the phase-modulated second sub-pulse in an attempt to detect the quantum key bit.

In accordance with a fourth broad aspect, the present invention seeks to provide a node operable to receive a quantum key. The node comprises a photon source operable to generate a pulse having multiple photons; a coupler operable to split the pulse into first and second sub-pulses, the first sub-pulse being sent along a first loop and the second sub-pulse being sent along a second loop shorter than the first loop; a phase modulator in the first loop operable to phase modulate the first sub-pulse with a secret key; a port operable to transmit both the phase-modulated first sub-pulse and the second sub-pulse to an other node, the other node being operable to encode at least one of the phase-modulated sub-pulse and the second sub-pulse with a quantum key bit. The port is further operable to receive the phase-modulated first sub-pulse and the second sub-pulse from the other node. The node further comprises a polarization beam splitter operable to send the received phase-modulated first sub-pulse along the second loop and the received second sub-pulse along the first loop. The phase modulator is further operable to phase modulate the received second sub-pulse with the secret key. The coupler is further operable to combine the received phase-modulated first sub-pulse and the phase-modulated received second sub-pulse to produce a composite pulse. The second node further comprises a detection unit operable to process the composite pulse in an attempt to detect the quantum key bit.

It will thus be appreciated by persons skilled in the art that quantum key distribution in accordance with certain embodiments of the invention enables use of multi-photon pulses without unacceptable loss of security, thereby enhancing the bit rate with which a quantum key can be distributed securely.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
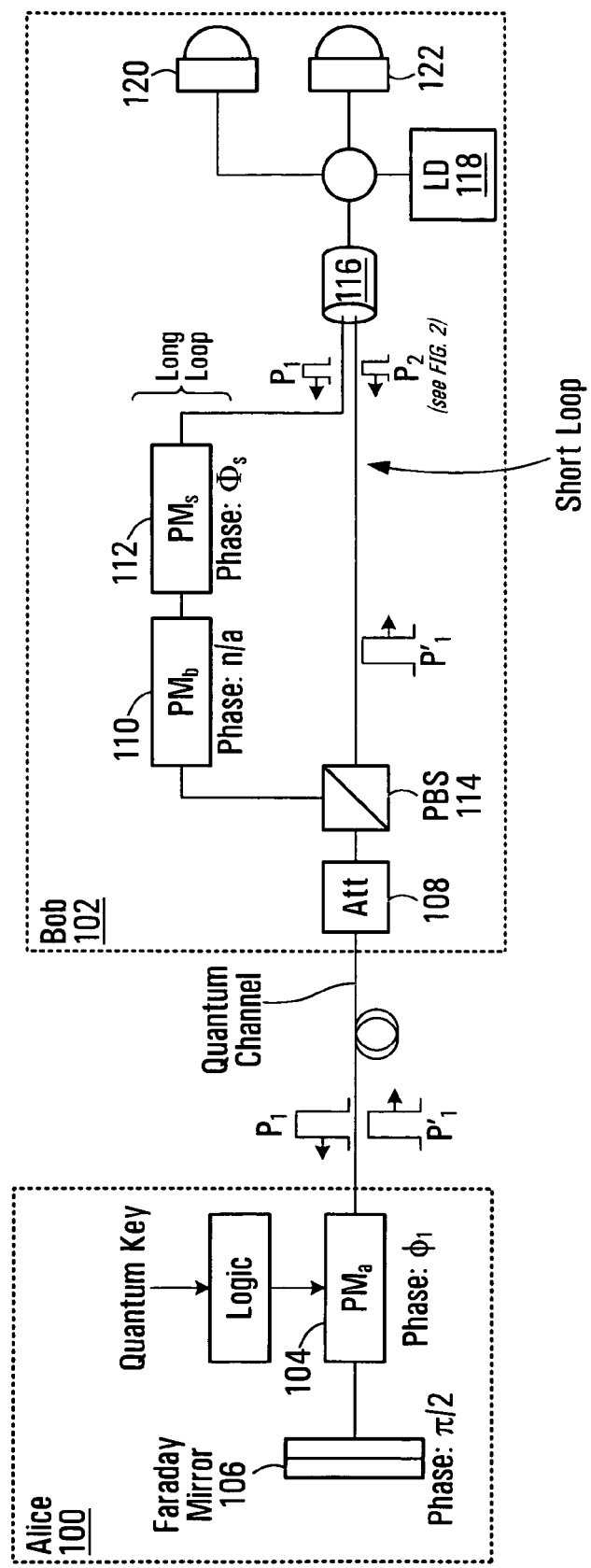
FIG. 1 is a block diagram illustrating travel of a first sub-pulse from a second node "Bob" to a first node "Alice" and back to Bob.
Figure 2:
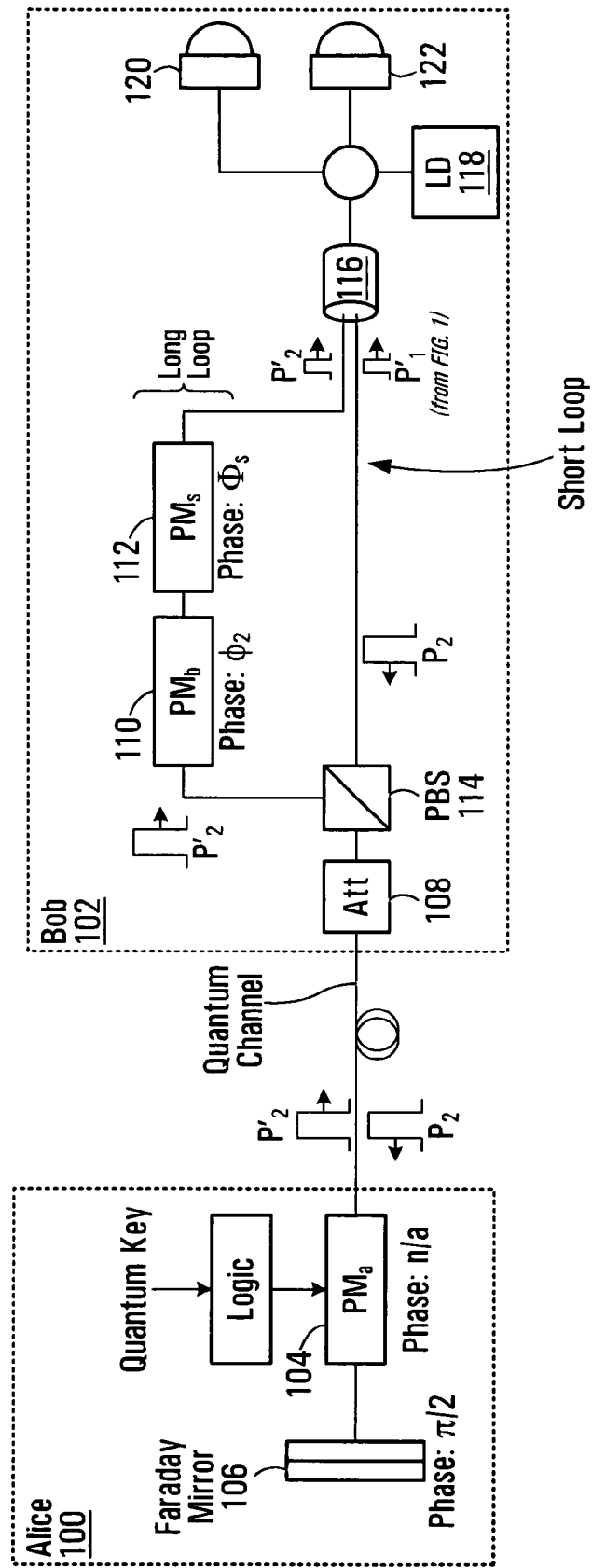
FIG. 2 is a block diagram illustrating travel of a second sub-pulse from Bob to Alice and back to Bob.

FIGS. 1 and 2 illustrate a first node 100 (also referred to as "Alice") and a second node 102 (also referred to as "Bob") of a communications network. Alice 100 and Bob 102 employ double phase encoding quantum key distribution ("QKD"). Alice 100, the sender of a quantum key having a plurality of quantum key bits, includes a phase modulator PMa 104 and a Faraday Mirror 106. Bob 102, the recipient of the quantum key, includes an attenuator 108, phase modulator PMb 110, phase modulator PMs 112, Polarization Beam Splitter (PBS) 114, a coupler (and/or beamsplitter) 116, a photon source 118 (e.g., a laser diode), and a detection unit (including a detector 120 triggered by a pulse affected with constructive interference and a detector 122 triggered by a pulse affected with destructive interference).

A series of short laser pulses is employed for quantum key distribution between Alice 100 and Bob 102. The short laser pulses are generated by the laser diode 118 at Bob 102. Considering now the case of a single pulse from the laser diode 118, coupler 116 splits the pulse into two pulses, hereinafter referred to as "P1" and "P2". Pulse P1 (shown in FIG. 1) is transmitted via a "long" loop and pulse P2 (shown partly in FIG. 1 but primarily in FIG. 2) is transmitted via a "short" loop.

Referring now to only FIG. 1, the phase modulator PMs 112 modulates a randomly-selected secret phase key Φs into the pulse P1 travelling in the long loop. The secret phase key Φs is unknown to Alice 100 and is used only by Bob 102. The secret phase key Φs can be randomly generated. The secret phase key is used to identify whether the pulses sent by Alice 100 really were based on pulses sent by Bob 102, i.e., whether the instant distribution of the quantum key has been attacked by an eavesdropper. It may be desirable that the secret phase key Φs differ from phase sequences modulated by phase modulators PMa 104 and PMb 110 (which in an embodiment are selected from quantum encoding bases B1 (having elements 0 and π) and B2 (having elements π/2 and 3π/2)). It is noted that Bob's phase modulator PMb 110 in the long loop is inactive at this time.

When pulse P1 arrives at PBS 114 (with phase Φs), the horizontal polarization of pulse P1 is reflected by to the attenuator 108. The attenuator 108 reduces the average photon number in pulse P1 to a selected level which is greater than one, so as to increase the likelihood of efficient, successful transmission, but not so large as to enable easy eavesdropping, e.g., μ=10. After suitable attenuation the pulse P1 is fed to a quantum channel (Q-channel) such as an optical fiber.

Alice 100 is operable to receive pulse P1 from the quantum channel and enable phase modulator PMa 104 to modulate the pulse P1 with a phase shift ø1 associated with a given quantum key bit. The phase shift ø1 will have a value that is characterized by a quantum encoding basis and a polarity. The choice of quantum encoding basis (i.e., B1 or B2) is random and is known only to Alice 100. Having selected which quantum encoding basis to use, for example B1 (where the possible phases are 0 and π), then the polarity (i.e., whether the phase shift ø1 will be 0 or π in the case of B1 or whether the phase shift ø1 will be π/2 or 3π/2 in the case of B2) depends on the value of the given quantum key bit that Alice 100 is transmitting. After having passed through the phase modulator PMa 104, pulse P1 will have a phase shift of Φs+ø1.

Next, pulse P1 arrives at the Faraday mirror 106, which reflects pulse P1 back and flips its polarization, i.e., causes a change of π/2 in the phase. The resulting pulse, which now has a phase shift of (Φs+ø1+π/2) and is denoted P1', is then transmitted back to Bob 102.

Bob 102 is operable to receive returning pulse P1' from Alice 100. The PBS 114 is operable to direct returning pulse P1' into the "short" loop due to the polarization flip by Alice's Faraday mirror 106. Returning pulse P1' then arrives at the coupler 116, where it is combined with a returned version of pulse P2, which will now be described.

Specifically, referring to FIG. 2, after being generated at Bob's coupler 116, pulse P2 takes the "short" loop. Upon arrival at the PBS 114, the PBS 114 transmits the vertical polarization of P2 towards the attenuator 108, where pulse P2 is subjected to the same attenuation as pulse P1, e.g., μ=10. Pulse P2 travels over the quantum channel as was described above with regard to pulse P1.

Alice 100 is then operable to receive pulse P2 from the quantum channel. Following receipt of pulse P2, Alice 100 is operable to flip the polarization of pulse P2 at Faraday mirror 106 (i.e., causes a change of π/2 in the phase). The reflected pulse, which now has a phase shift of π/2 and is denoted P2', is then sent back onto the quantum channel. It is noted that Alice's phase modulator PMa 104 is inactive at this time.

Bob 102 is operable to receive returning pulse P2' from Alice 100. Returning pulse P2' is directed into the long loop at the PBS 114 due its polarization flip at the Faraday mirror 106. On the long loop, Bob's phase modulator PMb 110 modulates a phase shift ø2 onto returning pulse P2'. The phase shift ø2 is characterized by a quantum encoding basis and a polarity. The quantum encoding basis is selected randomly from B1 and B2. As for the polarity, it can always be the same or it can vary, as long as Bob 102 remembers both the quantum encoding basis and the polarity used to modulate a given returning pulse P2'. In addition, phase modulator PMs then modulates returning pulse P2' with the same secret phase key Φs that was used to modulate pulse P1. Thus, returning pulse P2' now has a phase of (Φs+ø2+π/2).

Referring again to both FIGS. 1 and 2, returning pulses P1' and P2' arrive at Bob's coupler 116 at the same time because both pulses have traversed the same overall round-trip path, albeit with the loops in different order. Further, both returning pulses P1' and P2' will have been modulated with the same secret phase key Φs. Specifically, it is recalled that returning pulse P1' has a phase shift of (Φs+ø1+π/2) and returning pulse P2' has a phase shift of (Φs+ø2+π/2). Thus, the two returning pulses P1' and P2' combine at coupler 116 to form a composite pulse having a phase shift of Δø=ø1−ø2.

The detection unit operates on the composite pulse as follows: when the quantum encoding basis used by PMb 110 matches the quantum encoding basis used by PMa 104, the composite pulse will cause a measurement to be recorded at only one of the detectors (e.g., either detector 120 or detector 122). This is known as a "one-click". Under such circumstances, which of the two detectors 120, 122 will record a measurement will depend only on whether the polarity used by PMb 110 matches the polarity used by PMa 104. Of course, because Bob 102 knows the polarity used by Bob's own phase modulator PMb 110, the value of the quantum bit encoded by Alice 100 will be easily derivable by combining this polarity and the identity of the detector 120, 122 that records a measurement (which indicates whether ø2 did or did not happen to match ø1).

However, when the quantum encoding basis used by PMb 110 does not match the quantum encoding basis used by PMa 104, each photon in the composite pulse will be picked up by either detector 120 or detector 122 with approximately equal probability (as the interference is neither strictly constructive nor strictly destructive), which may even result in a measurement being recorded at both of the detectors 120, 122. Under such circumstances, there is no relation between the measurements at the detectors 120, 122 and the match or mismatch between the polarity used by Alice's phase modulator PMa 104 and the polarity used by Bob's phase modulator PMb 110. In short, the detection results cannot be relied upon to extract information.

It follows from the above that if Bob 102 were to know that the correct quantum encoding basis has been used for a given quantum key bit, then Bob 102 could learn the polarity of the quantum key bit by simply performing an "exclusive or" (XOR) between whatever polarity was used by Bob's phase modulator PMb 110 and the identity of the detector that recorded a measurement (using "0" for detector 120 and "1" for detector 122). Equivalently, if Bob 102 were to know that the correct quantum encoding basis has been used for a given quantum key bit, and if Bob's phase modulator PMb 110 were to consistently use the same polarity (e.g., 0) irrespective of the quantum encoding basis, then Bob 102 could detect the polarity of the quantum key bit by simply noting which of the two detectors 120, 122 recorded a measurement.

In order for Bob 102 to obtain the aforesaid knowledge of whether the correct quantum encoding basis was used in the first place, Bob 102 may publicly tell Alice 100 the quantum encoding bases that were used, and Alice 100 can then reply to Bob 102 specifying which are correct.

Now, having detected the polarities for a subset of the quantum key bits (i.e., for those instances where the quantum encoding basis used by PMb 110 matches the quantum encoding basis used by PMa 104), Bob 102 can determine the corresponding quantum key bits sent by Alice 100. This subset of quantum key bits can be referred to as a shifted key. Further steps can be performed (such as BB84 error correction and privacy amplification) and the final secret key can be determined.

From the above, it will be apparent that a general advantage of certain embodiments of the invention is more efficient and practical distribution of a quantum key having a plurality of quantum bits. Efficiency is enhanced because multiple photons can be used to represent each bit of the quantum key. Using multiple photons enable use of attenuator settings that are less likely to result in zero photons (complete attenuation).

Security against an "intercept-and-resend" attack is maintained because attempted eavesdropping can be detected from a phase mismatch being introduced by the attacking party. This gives rise to either (I) both detectors 120, 122 recording a measurement even though only one detector is expected to record a measurement; and/or (II) increased quantum bit error rate (QBER).

Security against a "photon-split" attack is maintained despite using multiple photons per pulse (where each individual photon in the pulse has 100% of the information of the encoded key bit value) due to the use of the secret phase key Φs, which is modulated by Bob 102 into pulse P1 on the way out and into returning pulse P2' upon receipt from Alice 100. Because of randomization of Φs it cannot be correctly guessed by the attacking party. Specifically, suppose that the attacking party indeed attempts a "photon-split" attack technique, i.e., by splitting a single photon portion p1 from P1' and p2 from P2' after these pulses have been sent by Alice 100. (Note that the phase shift of p1 is (Φs+ø1+π/2) and that the phase of p2 is (ø2+π/2) because it has not yet been processed by Bob's 102 long loop in the return path). The attacking party needs to combine p1 and p2 together to create an original photon which carries quantum key information. Also suppose that the attacking party somehow learns the measurement information from communication between Bob 102 and Alice 100 and somehow successfully guesses phase shifts ø1 and ø2. It is noted that the phase difference between p1 and p2 will be (ø1−ø2+Φs). Thus, even if the attacking party knows ø1 and ø2, the attacking party still cannot guess which detector (120 or 122) would record a measurement because of the attacking party's lack of knowledge about the secret phase key Φs. Further, the eavesdropping attempts will tend to increase the QBER, which can be detected by Bob 102. Therefore, the invention is a secure key distribution technique, even for multi-photon pulses.

Another advantage of certain embodiments of the invention is that the need for active polarization compensation is obviated. In particular, since the initial pulse is split into two pulses which traverse the same round-trip path there is no need for polarization compensation. Further, the same laser can be employed for both synchronization and key distribution. Other advantages will be apparent in view of the foregoing detailed description.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method of distributing a quantum key between a first node and a second node, comprising:
by the second node:
generating a pulse having multiple photons;
splitting the pulse into first and second sub-pulses;
phase modulating the first sub-pulse with a secret key;
transmitting both the phase-modulated first sub-pulse and the second sub-pulse to the first node;
by the first node:
receiving the phase-modulated first sub-pulse and the second sub-pulse from the second node;
encoding a quantum key bit into one of the sub-pulses received from the second node;
transmitting both the phase-modulated first sub-pulse and the second sub-pulse back to the second node;
by the second node:
receiving the phase-modulated first sub-pulse and the second sub-pulse from the first node;
phase modulating the second sub-pulse with the secret key;
processing the phase-modulated first sub-pulse and the phase-modulated second sub-pulse in an attempt to detect the quantum key bit.

2. The method defined in claim 1, wherein said transmitting is effected over a quantum channel.

3. The method defined in claim 2, wherein said encoding a quantum key bit into one of the sub-pulses received from the second node comprises encoding the phase-modulated first sub-pulse with the quantum key bit.

4. The method defined in claim 3, wherein said encoding the phase-modulated first sub-pulse with the quantum key bit comprises applying an additional phase shift to the phase-modulated first sub-pulse.

5. The method defined in claim 4, wherein said additional phase shift is selected to be one of two possible phase shifts associated with a value of said quantum key bit, wherein said one of two possible phase shifts is a function of a selected basis.

6. The method defined in claim 5, wherein said encoding the phase-modulated first sub-pulse with the quantum key bit further comprises selecting the selected basis from two possible quantum encoding bases.

7. The method defined in claim 6, wherein said selecting the selected basis occurs in a manner unknown to the second node.

8. The method defined in claim 7, wherein said processing the phase-modulated first sub-pulse and the phase-modulated second sub-pulse in an attempt to detect the quantum key bit comprises:
coupling the phase-modulated first sub-pulse to the phase-modulated second sub-pulse to derive a composite pulse; and
applying a quantum encoding basis to the composite pulse, thereby to cause a measurement to be recorded at at least one of a pair of detectors.

9. The method defined in claim 8, wherein said processing the composite pulse in an attempt to detect the quantum key bit further comprises obtaining knowledge of whether the encoding basis applied to the composite pulse corresponds to the quantum encoding basis selected by the first node.

10. The method defined in claim 9, wherein said processing the composite pulse in an attempt to detect the quantum key bit further comprises:
upon obtaining knowledge that the encoding basis applied to the composite pulse corresponds to the quantum encoding basis selected by the first node, using said measurement in the generation of a shifted key.

11. The method defined in claim 10, wherein said processing the composite pulse in an attempt to detect the quantum key bit further comprises:
upon obtaining knowledge that the encoding basis applied to the composite pulse does not correspond to the quantum encoding basis selected by the first node, disregarding said measurement in the generation of the shifted key.

12. The method defined in claim 1, further comprising the first node flipping a polarization of the phase-modulated first sub-pulse prior to transmission thereof to the second node.

13. The method defined in claim 12, further comprising the first node flipping a polarization of the second sub-pulse prior to transmission thereof to the second node.

14. The method defined in claim 1, wherein the quantum key has a total number of quantum key bits, further comprising executing the steps in the method for each of the quantum key bits in the quantum key.

15. The method defined in claim 14, further comprising the second node generating the secret key in a manner that is unknown to the first node.

16. The method defined in claim 15, the secret key having a total number of bits equal to the total number of quantum key bits in the quantum key.

17. The method defined in claim 1, further comprising the step of, prior to transmitting both the phase-modulated first sub-pulse and the second sub-pulse to the first node, attenuating the phase-modulated first sub-pulse and the second sub-pulse to reduce the number of photons in each of the phase-modulated first sub-pulse and the second sub-pulse to a number at least as great as one.

18. A method of participating in distribution of a quantum key with a first node, comprising:
generating a pulse having multiple photons;
splitting the pulse into first and second sub-pulses;
phase modulating the first sub-pulse with a secret key;
transmitting both the phase-modulated first sub-pulse and the second sub-pulse to the first node;
receiving the phase-modulated first sub-pulse and the second sub-pulse from the first node, one of the phase-modulated first sub-pulse and the second sub-pulse having been encoded with a quantum key bit;
phase modulating the second sub-pulse with the secret key;
processing the phase-modulated first sub-pulse and the phase-modulated second sub-pulse in an attempt to detect the quantum key bit.

19. An apparatus, comprising:
means for generating a pulse having multiple photons;
means for splitting the pulse into first and second sub-pulses;
means for phase modulating the first sub-pulse with a secret key;
means for transmitting both the phase-modulated first sub-pulse and the second sub-pulse to a node;
means for receiving the phase-modulated first sub-pulse and the second sub-pulse from the node, one of the phase-modulated first sub-pulse and the second sub-pulse having been encoded with a quantum key bit;

means for phase modulating the second sub-pulse with the secret key;

means for processing the phase-modulated first sub-pulse and the phase-modulated second sub-pulse in an attempt to detect the quantum key bit.

20. A node operable to participate in distribution of a quantum key, comprising:

a photon source operable to generate a pulse having multiple photons;

a coupler operable to split the pulse into first and second sub-pulses, the first sub-pulse being sent along a first loop and the second sub-pulse being sent along a second loop shorter than the first loop;

a phase modulator in the first loop operable to phase modulate the first sub-pulse with a secret key;

a port operable to transmit both the phase-modulated first sub-pulse and the second sub-pulse to an other node, the other node being operable to encode at least one of the phase-modulated sub-pulse and the second sub-pulse with a quantum key bit;

the port further operable to receive the phase-modulated first sub-pulse and the second sub-pulse from the other node;

a polarization beam splitter operable to send the received phase-modulated first sub-pulse along the second loop and the received second sub-pulse along the first loop;

the phase modulator further operable to phase modulate the received second sub-pulse with the secret key;

the coupler further operable to combine the received phase-modulated first sub-pulse and the phase-modulated received second sub-pulse to produce a composite pulse;

a detection unit operable to process the composite pulse in an attempt to detect the quantum key bit.

21. A network architecture operable to distribute a quantum key, comprising:

the node defined in claim 20, said node being a second node;

a first node, comprising a phase modulator operable to encode said quantum key bit into the phase-modulated first sub-pulse received from said second node.

22. The network architecture defined in claim 21, wherein the phase modulator in the second node is operable to apply an additional phase shift to the phase-modulated first sub-pulse.

23. The network architecture defined in claim 22, wherein the second node further comprises logic for selecting said additional phase shift to be one of two possible phase shifts associated with a value of said quantum key bit, wherein said one of two possible phase shifts is a function of a selected basis.

24. The network architecture defined in claim 23, wherein said logic in the second node is further operable to select the selected basis from two possible quantum encoding bases.

25. The network architecture defined in claim 24, wherein the second node further comprises a Faraday mirror operable to flip a polarization of the phase-modulated first sub-pulse and of the second sub-pulse prior to transmission thereof to the first node.

26. The network architecture defined in claim 25, wherein the first node further comprises logic for generating said secret key in a manner that is unknown to the second node.

27. The network architecture defined in claim 26, wherein the first node further comprises and attenuator operable to attenuate the phase-modulated first sub-pulse exiting the first loop and the second sub-pulse exiting the second loop to reduce the number of photons in each of the phase-modulated first sub-pulse and the second sub-pulse to a number at least as great as one.

* * * * *